(12) United States Patent
Lee et al.

(10) Patent No.: US 8,648,545 B2
(45) Date of Patent: Feb. 11, 2014

(54) REFERENCE VOLTAGE GENERATING DEVICE, CONTROL DEVICE INCLUDING THE REFERENCE VOLTAGE GENERATING DEVICE, AND LED LIGHT EMITTING DEVICE USING THE CONTROL DEVICE

(75) Inventors: Dong-Hun Lee, Bucheon (KR); Dong-Hee Kim, Bucheon (KR); Kyung-Goo Lee, Incheon (KR); Seok-Mun Choi, Seoul (KR)

(73) Assignee: Silicon Mitus, Inc., Seoul (KR)

( * ) Notice: Subject to any disclaimer, the term of this patent is extended or adjusted under 35 U.S.C. 154(b) by 698 days.

(21) Appl. No.: 12/825,445

(22) Filed: Jun. 29, 2010

(65) Prior Publication Data

US 2010/0327772 A1    Dec. 30, 2010

(30) Foreign Application Priority Data

Jun. 30, 2009  (KR) ......................... 10-2009-0058747

(51) Int. Cl.
  *H05B 37/02*    (2006.01)
(52) U.S. Cl.
  USPC ......................................... 315/291; 315/308
(58) Field of Classification Search
  USPC .......... 315/185 R, 209 R, 224, 225, 291, 307, 315/308, 312
  See application file for complete search history.

(56) References Cited

U.S. PATENT DOCUMENTS

| | | | | |
|---|---|---|---|---|
| 2007/0296353 A1* | 12/2007 | Ito et al. | .......................... | 315/307 |
| 2009/0230874 A1* | 9/2009 | Zhao et al. | ..................... | 315/192 |
| 2009/0230891 A1* | 9/2009 | Zhao et al. | ..................... | 315/308 |
| 2010/0134040 A1* | 6/2010 | Elder | ........................... | 315/294 |

FOREIGN PATENT DOCUMENTS

| | | |
|---|---|---|
| KR | 10-2007-0008107 A | 1/2007 |
| KR | 10-0673639 B | 1/2007 |
| KR | 10-2008-0032090 | 4/2008 |
| KR | 10-2008-0052784 A | 6/2008 |

OTHER PUBLICATIONS

SMBus 8-Channel LED Driver, Intersil, Dec. 22, 2008, ISL97635, FN6434.2, pp. 1-28.
8-String White LED Driver with SMBus for LCD Panel Applications, Maxim, 19-3211; Rev 0; Jan. 2008, MAX17061, pp. 1-26.
WLED Driver for Notebook Display, Texas Instruments, TPS61180/1/2,2007-2008.

* cited by examiner

*Primary Examiner* — Jimmy Vu
(74) *Attorney, Agent, or Firm* — Lexyoume IP Meister, PLLC.

(57) ABSTRACT

A control device and an LED light emitting device using the same are provided and technology of providing a high contrast ratio to the LED light emitting device and allowing the LED light emitting device to perform a stable operation is disclosed. The LED light emitting device includes a DC/DC converter reference voltage generator that generates a DC/DC converter reference voltage so that a minimum level of a channel voltage having a largest LED voltage drop agrees with a predetermined minimum reference voltage by detecting a plurality of channel voltages corresponding to LED voltage drops of each of a plurality of LED channels LED and an output voltage controller that controls an output voltage of the DC/DC converter using a distribution voltage corresponding to an output voltage and the DC/DC converter reference voltage.

7 Claims, 6 Drawing Sheets

REFERENCE VOLTAGE GENERATING DEVICE, CONTROL DEVICE INCLUDING THE REFERENCE VOLTAGE GENERATING DEVICE, AND LED LIGHT EMITTING DEVICE USING THE CONTROL DEVICE

CROSS-REFERENCE TO RELATED APPLICATION

This application claims priority to and the benefit of Korean Patent Application No. 10-2009-0058747 filed in the Korean Intellectual Property Office on Jun. 30, 2009, the entire contents of which are incorporated herein by reference.

BACKGROUND OF THE INVENTION (a) Field of the Invention

The present invention relates to a reference voltage generating device that generates a reference voltage for controlling operation of a control device and a light emitting diode (LED) light emitting device using the control device, a control device including the reference voltage generating device, and an LED light emitting device including the reference voltage generating device.

(b) Description of the Related Art

A light emitting device can be used for displaying an image, or can be used as a light source of a display device such as a liquid crystal display (LCD). Particularly, a light emitting device that is formed with a plurality of LEDS is widely used as a back light of an LCD. The LED light emitting device also includes a plurality of LED channels in which a plurality of LED elements are arranged in series and includes a DC/DC converter that supplies an output voltage to each of the plurality of LED channels. An output voltage is supplied to one ends of each of the plurality of LED channels, and a constant current source that controls a current flowing to each of the plurality of LED channels is connected to the other end thereof. The constant current source includes a sync current source and is connected to each of the plurality of LED channels to constantly sustain a current. When a current flows to an LED element and thus light is emitted, a voltage drop occurs in a current direction of both ends of LED. Therefore, the DC/DC converter should output a fully high voltage in consideration of a voltage drop of each LED channel.

However, in view of characteristics of an LED element, voltage drops of LED elements are not constant. If an output voltage of the DC/DC converter is smaller than a voltage drop of each LED channel, a current flowing to a constant current source becomes smaller than a desired value or does not flow. If an output voltage of the DC/DC converter is larger than a voltage drop of each LED channel, power loss increases in the constant current source. Therefore, in order to optimize the output of the DC/DC converter, a headroom controller is used. A voltage of a plurality of LED channels that are detected at an end portion of a plurality of LED channels is a voltage that subtracts an LED voltage drop of each channel from a DC/DC converter output voltage. That is, as LED voltage drop increases, a channel voltage is lowered. The headroom controller detects voltages of each of a plurality of LED channels and selects a minimum value of the detected voltages. The selected minimum value is fed back to the DC/DC converter. That is, when a current continues to flow in all channels, the headroom controller controls an output voltage of the DC/DC converter by feeding back an LED channel voltage having a largest voltage drop.

A method of adjusting brightness of an LED element includes an analog method and a pulse width modulation method. The analog method is a method of adjusting the magnitude of a current continuously flowing to the LED element, and the pulse width modulation method is a method of adjusting a pulse width of a discontinuously flowing current having a predetermined magnitude. In the analog method, when a current flowing to the LED element is small, a color coordinate changes, but in the pulse width modulation method, because a color coordinate does not change, the pulse width modulation method is mainly used. A pulse width modulation method of an LED light emitting device including a plurality of LED channels includes a no delay pulse width modulation method of simultaneously flowing a current of all LED channels and a phase shift pulse width modulation method of allowing a current of each LED channel to have a predetermined delay time and to sequentially flow.

Because the phase shift pulse width modulation method has a relatively smaller load change than that of the no delay pulse width modulation method, an output voltage pulsation of the DC/DC converter is small and a frequency of the pulse width modulation method increases and thus screen noise of the LCD reduces. Further, because a load change is small and a frequency is high, noise of the DC/DC converter reduces.

When applying the phase shift pulse width modulation method to the LED light emitting device including a plurality of LED channels, because voltage drops of each LED channel are different, whenever channels in which a current flows change, a minimum voltage of the plurality of LED channels changes. Therefore, whenever channels in which a current flows change, the output of the DC/DC converter also changes. When a current flows to a channel having a small voltage drop, the output of the DC/DC converter reduces, and when a current flows to a channel having a large voltage drop, the output of the DC/DC converter increases. Therefore, while the output of the DC/DC converter increases, a current having a value smaller than that of a desired current flows or a current does not flow to a channel having a large voltage drop.

Particularly, when a pulse width modulation frequency is high and an LED element has low brightness, a current does not flow. In such a case, there is a problem that a contrast ratio of the LED light emitting device is deteriorated. In order to solve such a problem, a voltage of each of a plurality of LED channels is sampled and held to be fed back to the DC/DC converter. By using this method, when a current does not flow to a constant current source of each LED channel or when a current flows to a constant current source of a channel having a low LED voltage drop, an output voltage of the DC/DC converter and an error amplifier is sustained to an output voltage when a current flows to a channel having a largest LED voltage drop. However, even if this method is used, a predetermined delay time occurs in a sampling holding circuit, and thus when a response speed of the DC/DC converter becomes quick, there is a problem that an entire operation becomes unstable.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a reference voltage generating device, a control device, and an LED light emitting device using the same having advantages of providing a high contrast ratio to the LED light emitting device and allowing the LED light emitting device to perform a stable operation.

An exemplary embodiment of the present invention provides a reference voltage generating device including a plurality of LED channels that are formed with a plurality of LED elements that are continuously connected in series and that generates a reference voltage for controlling an output voltage that is supplied to each of the plurality of LED channels. The reference voltage generating device includes a voltage detection unit that detects a plurality of channel voltages corresponding to an LED voltage drop by a plurality of LEDS of each of the plurality of LED channels and that outputs a minimum value of the detected plurality of channel voltages; and a voltage controller that controls the reference voltage so that the minimum value agrees with a predetermined minimum reference voltage. The voltage controller may raise, if the minimum value is lower than the minimum reference voltage, the reference voltage in order to raise the output voltage. The voltage controller may reduce, if the minimum value is higher than the minimum reference voltage, the reference voltage. A rising amount of the reference voltage per predetermined unit time when the minimum value is lower than the minimum reference voltage may be larger than a falling amount of the reference voltage per the unit time when the minimum value is higher than the minimum reference voltage.

Another embodiment of the present invention provides a control device of an LED light emitting device including a plurality of LED channels that are formed with a plurality of LED elements, including: a DC/DC converter that supplies an output voltage to the plurality of LED channels; and a reference voltage generator that generates a reference voltage for controlling the output voltage, wherein the reference voltage generator detects a plurality of channel voltages corresponding to an LED voltage drop by a plurality of LEDS of each of the plurality of LED channels and controls the reference voltage so that a minimum value of the plurality of channel voltages agrees with a predetermined minimum reference voltage. The reference voltage generator may raise, if the minimum value is lower than the minimum reference voltage, the reference voltage in order to raise the output voltage. The reference voltage generator may reduce, if the minimum value is higher than the minimum reference voltage, the reference voltage. A rising amount of a reference voltage per predetermined unit time when the minimum value is lower than the minimum reference voltage may be larger than a falling amount of the reference voltage per the unit time when the minimum value is higher than the minimum reference voltage.

The DC/DC converter may include a power stage that includes a power switch, an inductor, and a capacitor and that generates the output voltage by converting an input voltage that is transferred to the inductor according to a switching operation of the power switch; and an output voltage controller that controls the output voltage by controlling a switching operation of the power switch using a distribution voltage corresponding to the output voltage and the reference voltage. The output voltage controller may include a compensation circuit that generates an output control signal by compensating an error signal corresponding to a difference between the reference voltage and the distribution voltage; and a switching controller that determines a turn-off time point of the power switch according to the output control signal and that turns on the power switch according to a predetermined clock signal that determines a switching frequency of the power switch. The DC/DC converter may further include an error amplifier that generates the error signal by receiving the distribution voltage in an inversion terminal and receiving the reference voltage in a non-inversion terminal and amplifying a difference between the distribution voltage and the reference voltage. The reference voltage generator may include a voltage detection unit that detects the plurality of channel voltages and that outputs a minimum value of the detected plurality of channel voltages; and a voltage controller that compares the minimum value and a level of the minimum reference voltage and that increases, if the minimum value is lower than the minimum reference voltage, the DC/DC converter reference voltage, and that decreases, if the minimum value is higher than the minimum reference voltage, the DC/DC converter reference voltage.

Yet another embodiment of the present invention provides an LED light emitting device including: an LED light emitting unit including a plurality of LED channels that are formed with a plurality of LED elements that are connected in series; a constant current source that controls a current flowing to each of the plurality of LED channels; and a control device that receives an input voltage to supply an output voltage to the plurality of channels and that detects a plurality of channel voltages corresponding to an LED voltage drop of each of the plurality of LED channels and that generate a reference voltage so that a minimum value of the detected plurality of channel voltages agrees with a predetermined minimum reference voltage, and that controls the output voltage according to the reference voltage. The constant current source may include a plurality of sync current sources that are connected to an end portion of each of the plurality of channels. Each of the plurality of sync current sources may include a switch having a first electrode that is connected to an end portion of the LED channel; a resistor having one end that is connected to a second electrode of the switch and the other end that is connected to the ground; and an amplifier having an output stage that is connected to a control electrode of the switch, a non-inversion terminal to which a corresponding dimming signal of a plurality of PWM dimming signals is input, and an inversion terminal that is connected to the second electrode of the switch.

The control device may include a DC/DC converter that controls the output voltage using a distribution voltage corresponding to the output voltage and the reference voltage; and a reference voltage generator that generates the reference voltage, wherein the reference voltage generator includes a voltage detection unit that detects the plurality of channel voltages and that outputs a minimum value of the detected plurality of channel voltages; and a voltage controller that compares the minimum value and a level of the minimum reference voltage and that increases, if the minimum value is lower than the minimum reference voltage, the reference voltage and that decreases, if the minimum value is higher than the minimum reference voltage, the reference voltage.

The DC/DC converter may include a power stage that includes a power switch, an inductor, and a capacitor and that generates the output voltage by converting an input voltage that is transferred to the inductor according to a switching operation of the power switch; and an output voltage controller that controls the output voltage by controlling a switching operation of the power switch using a distribution voltage corresponding to the output voltage and the reference voltage. The output voltage controller may include a compensation circuit that generates an output control signal by compensating an error signal corresponding to a difference between the reference voltage and the distribution voltage; and a switching controller that determines a turn-off time point of the power switch according to the output control signal and that turns on the power switch according to a predetermined clock signal that determines a switching frequency of the power switch. The DC/DC converter may further include an error amplifier that generates the error signal by receiving the distribution voltage in an inversion terminal and receiving the reference voltage in a non-inversion terminal and amplifying a difference between the distribution voltage and the reference voltage. A rising amount of the reference voltage per predetermined unit time when the minimum value is lower than the minimum reference voltage may be larger than a falling amount of the reference voltage per the unit time when the minimum value is higher than the minimum reference voltage.

As described above, according to characteristics of the present invention, a reference voltage generating device, a control device, and an LED light emitting device using the same that provide a high contrast ratio to the LED light emitting device and that allow the LED light emitting device to perform a stable operation are provided.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Figure 1:
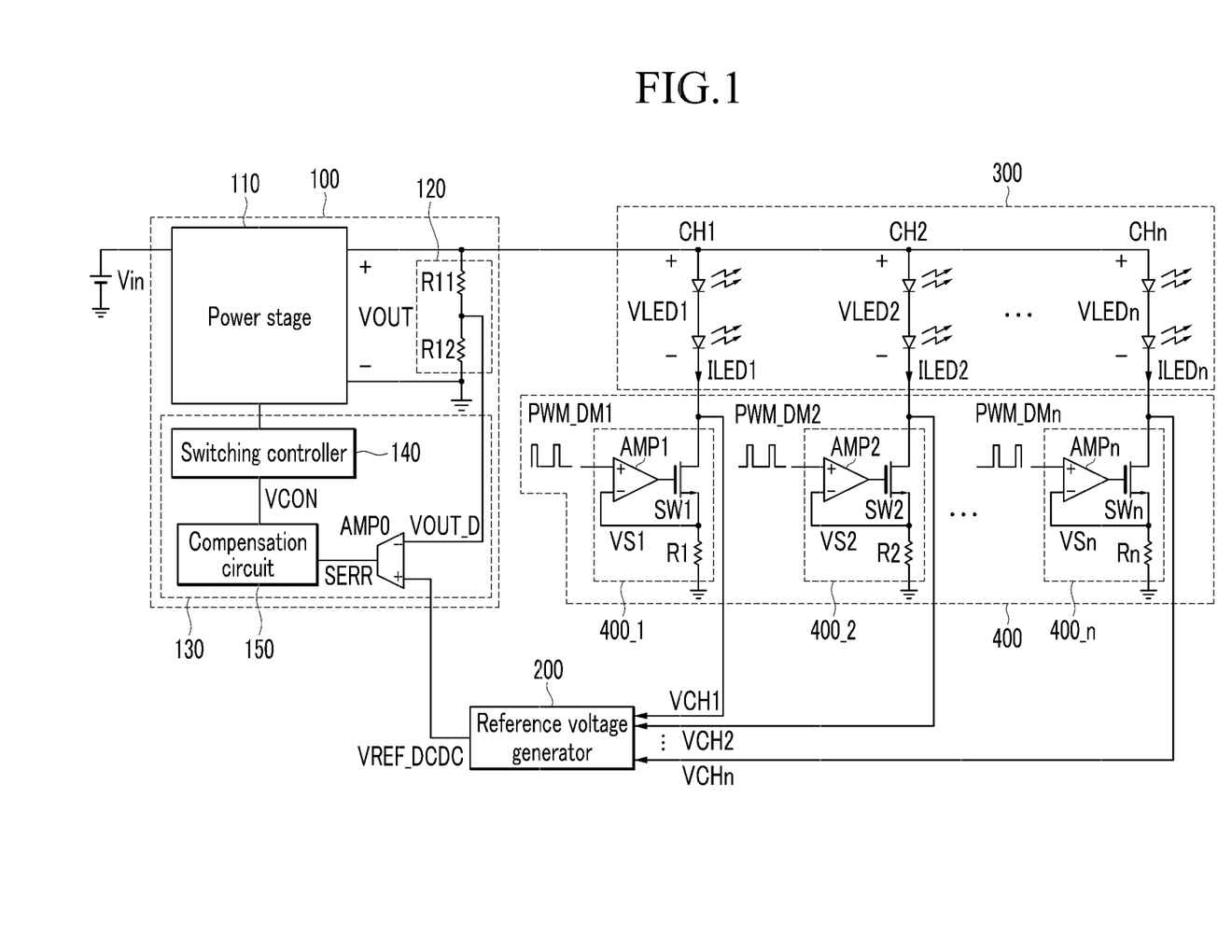
FIG. 1 is a diagram illustrating a reference voltage generating device and an LED light emitting device to which a control device including the reference voltage generating device is applied according to an exemplary embodiment of the present invention.

FIG. 1 is a diagram illustrating a reference voltage generating device and an LED light emitting device to which a control device including the reference voltage generating device is applied according to an exemplary embodiment of the present invention.

Referring to FIG. 1, the LED light emitting device includes a DC/DC converter 100, a reference voltage generator 200, an LED light emitting unit 300, and a constant current source 400. The DC/DC converter 100 and the reference voltage generator 200 are control devices of the LED light emitting device.

The DC/DC converter 100 receives a reference voltage VREF_DCDC for controlling an output voltage VOUT of the DC/DC converter from the reference voltage generator 200, detects information about the output voltage VOUT, and controls the output voltage VOUT according to a compared result of the detected information and the reference voltage VREF_DCDC. The output voltage VOUT of the DC/DC converter 100 is supplied to a plurality of channel CH1-CHn. The DC/DC converter 100 includes a power stage 110, a resistance distribution unit 120, and an output voltage controller 130.

The power stage 110 is formed with a combination of a power switch, an inductor, and a capacitor and generates an output voltage by converting an input voltage that is input to the inductor according to a switching operation of the power switch. According to a switching operation of the power switch, power is stored in the inductor or power is output from the inductor to be transferred to the LED light emitting unit 300. The capacitor smoothes the output voltage VOUT. The power stage 110 can be embodied in various methods and thus in FIG. 1, the power switch, the inductor, and the capacitor are not shown in detail.

The resistance distribution unit 120 outputs a distribution voltage VOUT_D, which is information about an output voltage by distributing resistance of the output voltage VOUT of the DC/DC converter 100. The resistance distribution unit 120 includes first and second resistors R11 and R12. The first and second resistors R11 and R12 are connected in series between an output stage of the DC/DC converter 100 and the ground.

The output voltage controller 130 controls a switching operation of the power stage 110 by comparing information about an output voltage (hereinafter, referred to as a "distribution voltage VOUT_D") and a reference voltage, thereby controlling an output voltage VOUT. The output voltage controller 130 includes a switching controller 140, a compensation circuit 150, and an error amplifier AMP0. The error amplifier AMP0 generates an error signal SERR by amplifying a difference between a reference voltage VREF_DCDC and a distribution output voltage VOUT_D.

The compensation circuit 150 generates an output control signal VCON by compensating the error signal SERR. Specifically, the compensation circuit 150 generates an output control signal VCON by compensating the error signal SERR so that a gain margin and a phase margin of a loop transfer function of the DC/DC converter 100 may have an appropriate value.

The switching controller 140 controls a switching operation using the output control signal VCON. The switching controller 140 can variously embody a method of controlling a switching operation using an output control signal. Specifically, there is a method of turning on a switch according to a predetermined clock signal that determines a frequency of a switching operation and turning off the switch using a compared result of a current flowing to the switch of the power stage 110 and the output control signal VCON. Further, there is a method of turning on the switch according to a predetermined clock signal that determines a frequency of a switching operation and turning off the switch when a chopping signal increasing for a turn-on period of the switch reaches the output control signal VCON. In addition, various methods may exist, and the present invention can be applied to any method.

The error amplifier AMP0 outputs an error signal SERR by amplifying a difference between a distribution voltage VOUT_D that is input to an inversion terminal (−) and a reference voltage VREF_DCDC that is input to a non-inversion terminal (+).

The reference voltage generator 200 changes a level of a reference voltage VREF_DCDC by detecting channel voltages VCH1-VCHn of each of a plurality of LED channels CH1-CHn. The reference voltage generator 200 generates a reference voltage VREF_DCDC so that a minimum level of a channel voltage having a largest LED voltage drop agrees with a predetermined minimum reference voltage VREF by detecting a plurality of channel voltages VCH1-VCHn corresponding to an LED voltage drop of each of the plurality of channels CH1-CHn. When a constant current flows to the channel, a minimum reference voltage is determined in considering of a saturation voltage of both ends of the switch operating in a saturation area and a voltage of both ends of a resistor.

A detailed configuration and operation of the DC/DC reference voltage generator 200 will be described later with reference to FIGS. 3 and 4.

The LED light emitting unit 300 includes a plurality of LED channels CH1-CHn. A plurality of LED elements are connected in series to the plurality of LED channels CH1-CHn, respectively. In each of the plurality of LED channels CH1-CHn, a voltage drop occurs by the plurality of LED elements, and the voltage drops may be different in each of the plurality of LED channels CH1-CHn due to a difference in characteristics of the LED elements.

The constant current source 400 includes a plurality of sync current sources 400_1-400_n. The plurality of sync current sources 400_1-400_n are connected to end portions of each of the plurality of LED channels CH1-CHn to synchronize a predetermined current. The plurality of sync current sources 400_1-400_n uniformly control the magnitude of currents ILED1-ILEDn flowing to each of the channels CH1-CHn. Accordingly, a light emitting amount of a plurality of LED elements of each of the channels CH1-CHn becomes uniform.

A first sync current source 400_1 includes a first amplifier AMP1, a first switch SW1, and a first resistor R1. In an exemplary embodiment of the present invention, a first to N-th switches SW1-SWn are formed with an NMOSFET but are not limited thereto and may be formed with a PMOSFET or a BJT.

The first sync current source 400_1 will be described as follows. The first amplifier AMP1 compares a first PWM dimming signal PWM_DM1 that is input to a non-inversion terminal (+) and a signal that is input to an inversion terminal (−). Here, a signal that is input to the inversion terminal (−) of the first amplifier AMP1 is a voltage (hereinafter, referred to as a "channel current detection voltage") VS1 generating when a first channel current ILED1 flowing through the first switch SW1 flows to the first resistor R1. The first PWM dimming signal PWM_DM1 is a signal for driving the LED light emitting unit 300 with a pulse width modulation method. The first PWM dimming signal PWM_DM1 is a high pulse signal having a predetermined cycle, and a light emitting amount of a plurality of LED elements of the first channel CH1 is controlled according to a high pulse width of the first PWM dimming signal PWM_DM1.

A drain terminal of the first switch SW1 is connected to an end portion of the first channel CH1, and a gate terminal of the first switch SW1 is connected to an output stage of the first amplifier AMP1. A source terminal of the first switch SW1 is connected to the inversion terminal (−) of the first amplifier AMP1. One end of the first resistor R1 is connected to a source terminal of the first switch SW1, and the other end of the first resistance R1 is grounded. The first amplifier AMP1 generates an output signal so that the first PWM dimming signal PWM_DM1 that is input to the non-inversion terminal (+) and the channel current detection voltage VS1 may be identical. If the first PWM dimming signal PWM_DM1 is in a high level, an output signal of the first amplifier AMP1 increases and a voltage that is applied to the gate terminal of the first switch SW1 increases and thus impedance of the first switch SW1 decreases, whereby a current flowing to the first switch SW1 increases. Accordingly, a high level voltage of the first PWM dimming signal PWM_DM1 and a channel current detection voltage VS1 become identical. If the first PWM dimming signal PWM_DM1 is in a low level, an output signal of the first amplifier AMP1 decreases, and a voltage that is applied to the gate terminal of the first switch SW1 decreases and thus impedance of the second switch SW2 increases, whereby a current flowing to the first switch SW1 decreases.

Accordingly, a low level voltage of the first PWM dimming signal PWM_DM1 and the channel current detection voltage VS1 become identical. According to such an operation, a current flowing to the first switch SW1 is controlled. A second switch SW2, a second amplifier AMP2, and a second resistor R2 of a second sync current source 400_2, an N-th switch SWn, an N-th amplifier AMPn, and an N-th resistor Rn of an N-th sync current source 400_n are equal to corresponding elements of the first sync current source 400_1 and thus a description thereof will be omitted. The first to N-th PWM dimming signals PWM_D1-PWM_Dn are a pulse signal having a predetermined cycle.

Figure 2:
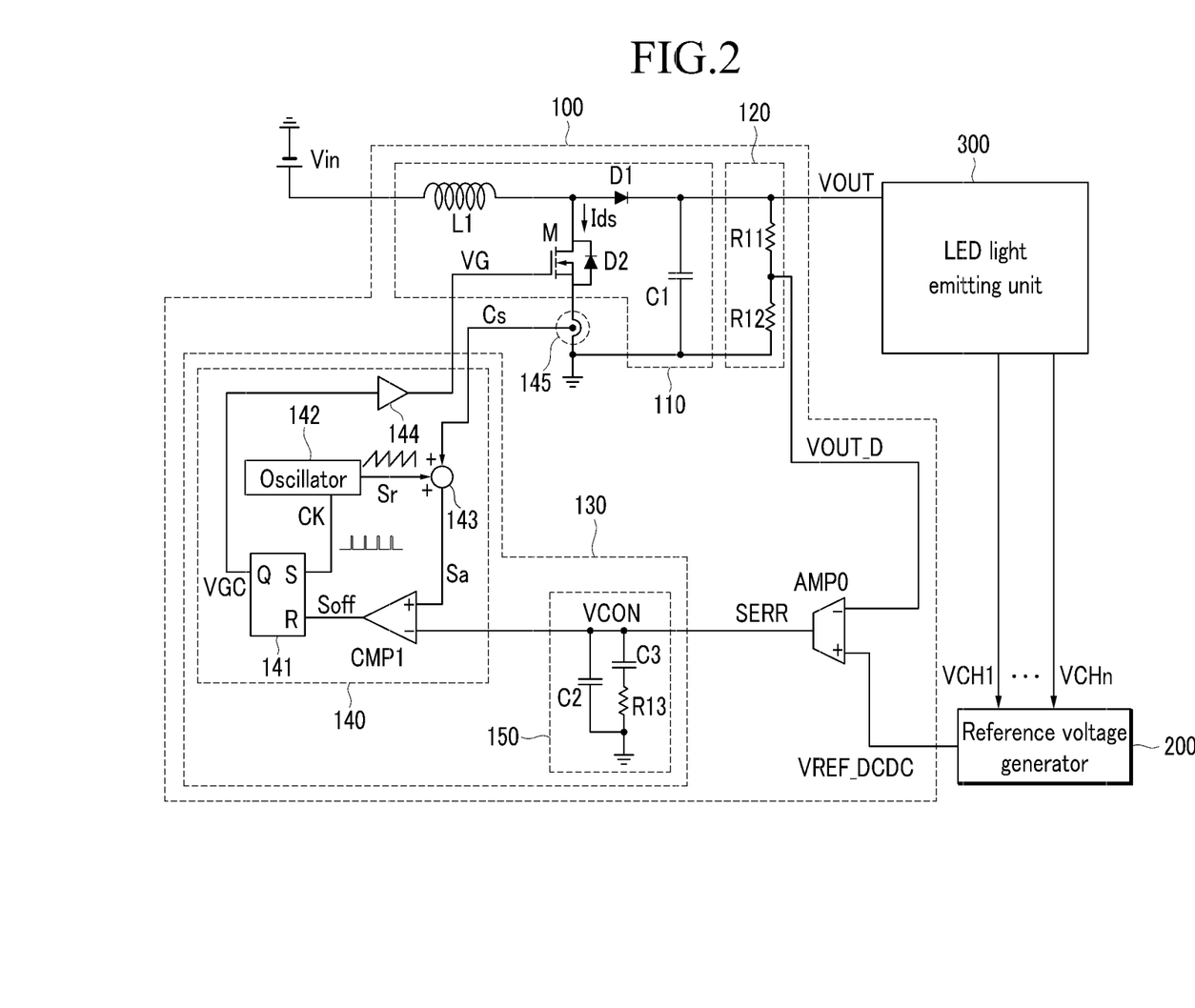
FIG. 2 is a diagram illustrating a configuration of a DC/DC converter according to an exemplary embodiment of the present invention.

FIG. 2 is a diagram illustrating a configuration of a DC/DC converter 100 according to an exemplary embodiment of the present invention. In FIG. 2, the power stage 110 is embodied as a boost converter, but the present invention is not limited thereto.

The power stage 110 includes an inductor L1, a power switch M, a first diode D1, a body diode D2 of the power switch, and a first capacitor C1.

An input voltage Vin is supplied to one end of the inductor L1, and the other end of the inductor L1 is connected to an anode of the first diode D1. One end of the first capacitor C1 is connected to a cathode of the first diode D1, and the other end of the first capacitor C1 is connected to a ground voltage application stage. A drain electrode of the power switch M is connected to the other end of the inductor L1, and a source electrode thereof is connected to the ground. The body diode D2 is connected in parallel to the power switch M.

A current corresponding to the input voltage Vin flows to the inductor L1, and the power switch M is switched according to a gate signal VG that is output from the switching controller 140 to control a current flowing to the inductor L1. If the power switch M is turned on, the first diode D1 is intercepted, and a current flowing to the inductor L1 flows through the power switch M. If the power switch M is turned off, the first diode D1 is electrically connected, and a current flowing to the inductor L1 flows through the first diode D1. If the power switch M is turned off, the first capacitor C1 is charged by a current flowing to the inductor L1 to generate an output voltage VOUT.

The switching controller 140 generates a gate signal VG according to an output control signal VCON, information about a current (hereinafter, a drain current) flowing to the power switch M, and a clock signal that determines a switching frequency. The switching controller 140 controls turning off of the power switch M using the output control signal VCON and information about a drain current and controls turning on of the power switch M according to a clock signal CK. The switching controller 140 includes a PWM comparator CMP1, an S-R latch 141, an oscillator 142, an adder 143, a gate driver 144, and a current sensor 145.

The current sensor 145 generates a sensing signal Cs, which is information about a drain current. Specifically, the current sensor 145 generates a sensing signal Cs by converting a drain current to a voltage.

The adder 143 outputs an addition signal Sa by adding a lamp signal Sr and a sensing signal Cs.

The oscillator 142 generates a lamp signal Sr and a clock signal CK. Here, the clock signal CK is a signal that determines a switching operation frequency by determining a turn-on time point of the power switch M and is a high pulse signal having a predetermined cycle.

The PWM comparator CMP1 outputs an off control signal Soff by comparing an output control signal VCON that is input to an inversion terminal (−) and an addition signal Sa that is input to a non-inversion terminal (+). The PWM comparator CMP1 outputs, if the addition signal Sa is larger than the output control signal VCON, an off control signal Soff of a high level and outputs, if the addition signal Sa is smaller than the output control signal VCON, an off control signal Soff of a low level.

The S-R latch 141 receives a clock signal CK in the set terminal S and receives an off control signal Soff in a reset terminal R to output a gate control signal VGC to an output terminal Q. The S-R latch 141 outputs, if an input signal of the set terminal S is in a high level, a gate control signal VGC of a high level through the output terminal Q and outputs, if an input signal of the reset terminal R is in a high level, a gate control signal VGC of a low level through the output terminal Q, and sustains, if both signals are in a low level, a level of a present gate control signal VGC.

The driver 144 generates a gate signal VG according to the gate control signal VGC to output the gate signal VG to the gate electrode of the power switch M. If the gate control signal VGC is in a high level, the driver 144 generates a gate signal VG for turning on the power switch M, and if the gate control signal VGC is in a low level, the driver 144 generates a gate signal VG for turning off the power switch M. In an exemplary embodiment of the present invention, the power switch M is turned on according to a gate signal VG of a high level, and the power switch M is turned off according to a gate signal VG of a low level.

The compensation circuit 150 includes a second capacitor C2, a third capacitor C3, and a resistor R13. One end of the second capacitor C2 and the third capacitor C3 is connected to an output stage of the error amplifier AMP0, the other end of the second capacitor C2 is grounded, and the other end of the third capacitor C3 is connected to one end of the resistor R1. The other end of the resistor R13 is grounded. The second capacitor C2, the third capacitor C3, and the resistor R13 are set so that a gain margin and a phase margin of a loop transfer function of the DC/DC converter 100 have an appropriate value.

In FIG. 2, if a reference voltage VREF_DCDC increases, a difference between the distribution voltage VOUT_D and the reference voltage VREF_DCDC increases and thus an error signal SERR increases, and an output control signal VCON also increases. Accordingly, because a period in which an addition signal Sa reaches the output control signal VCON increases, a generating time point of the off control signal Soff is delayed. Therefore, as duty of the power switch M increases, the output voltage VOUT increases. If a reference voltage VREF_DCDC decreases, the error signal SERR decreases and the output control signal VCON also decreases. Accordingly, because a period in which the addition signal Sa reaches the output control signal VCON decreases, a generating time point of the off control signal Soff is advanced. Therefore, as duty of the power switch M decreases, an output voltage decreases.

Figure 3:
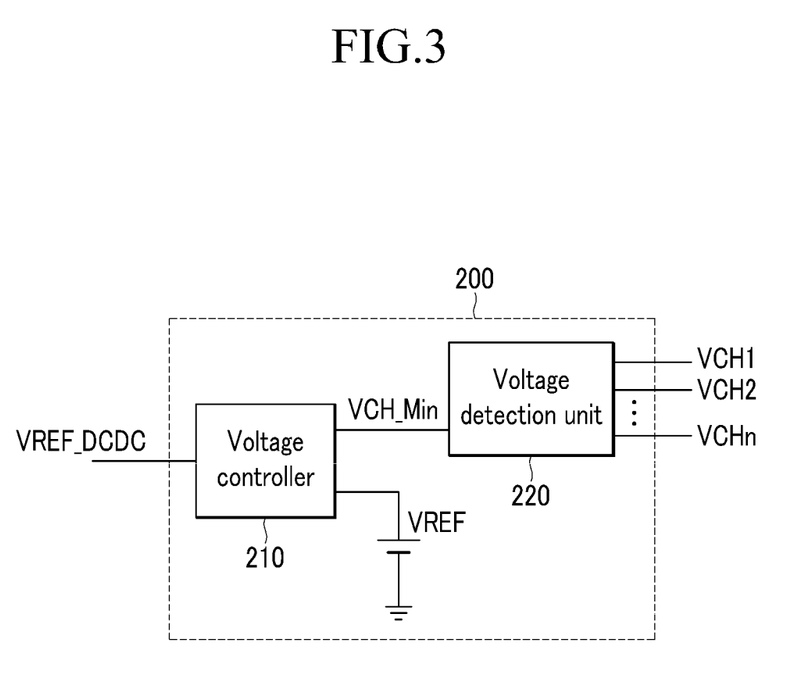
FIG. 3 is a detailed circuit diagram of a reference voltage generator that is shown in FIG. 1.

FIG. 3 is a detailed circuit diagram of a reference voltage generator 200 that is shown in FIG. 1.

Referring to FIG. 3, the reference voltage generator 200 includes a voltage controller 210 and a voltage detection unit 220.

The voltage detection unit 220 detects a plurality of channel voltages VCH1-VCHn and outputs a minimum value VCH_Min of the detected channel voltage. The voltage controller 210 compares the minimum value VCH_Min with a level of the minimum reference voltage VREF and raises, if the minimum value VCH_Min is lower than a level of the minimum reference voltage VREF, the reference voltage VREF_DCDC so that the minimum value VCH_Min may be equal to a level of the minimum reference voltage VREF. If the minimum value VCH_Min is higher than a level of the minimum reference voltage VREF, the voltage controller 210 reduces a level of the reference voltage VREF_DCDC.

In this case, a decrease amount per unit time of the reference voltage VREF_DCDC when the minimum value VCH_Min is higher than the minimum reference voltage VREF is much smaller than an increase amount per unit time of the reference voltage VREF_DCDC when the minimum value VCH_Min is lower than the minimum reference voltage VREF. A unit time is appropriately set according to a design. Therefore, for a period in which the minimum value VCH_Min is higher than the minimum reference voltage VREF, the reference voltage VREF_DCDC hardly reduces, and a level of the reference voltage VREF_DCDC is substantially uniformly sustained. Hereinafter, operation of the reference voltage generator 200 will be described with referring to FIGS. 4 and 5.

Figure 4:
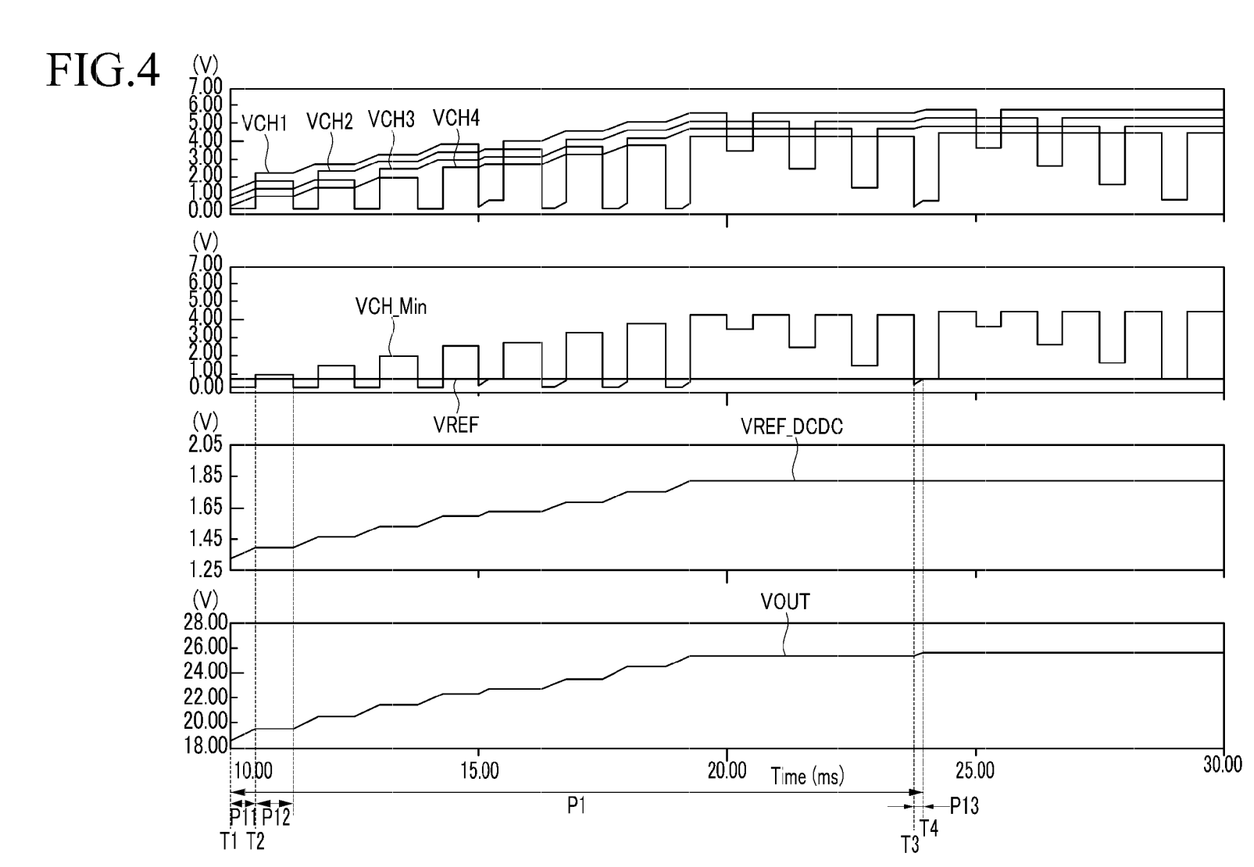
FIG. 4 is a waveform diagram illustrating a plurality of channel voltages, a minimum value of the plurality of channel voltages, a minimum reference voltage, a reference voltage, and an output voltage in a transition state of a DC/DC converter and in a steady state after a transition state.

FIG. 4 is a waveform diagram illustrating a plurality of channel voltages VCH1-VCH4, a minimum value VCH_Min and a minimum reference voltage VREF of the plurality of channel voltages VCH1-VCH4, a reference voltage VREF_DCDC, and an output voltage VOUT in a transition state of a DC/DC converter and in a steady state after a transition state. A rising period before the output voltage VOUT is stabilized to a predetermined level is referred to as a transition state (period P1).

Figure 5:
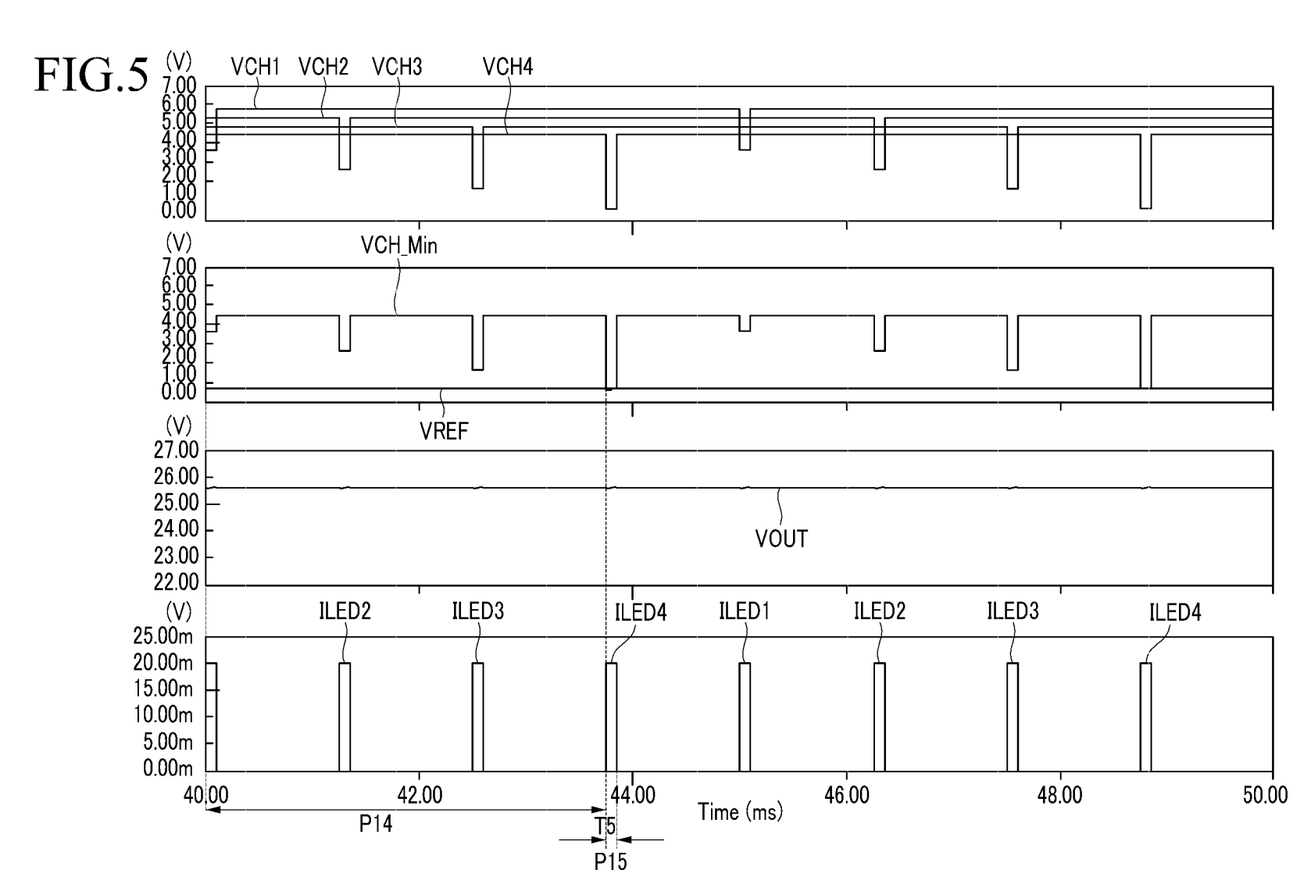
FIG. 5 is a waveform diagram illustrating a plurality of channel voltages, a minimum value of the plurality of channel voltages, a minimum reference voltage, an output voltage, and a plurality of channel currents in a steady state.

FIG. 5 is a waveform diagram illustrating a plurality of channel voltages VCH1-VCH4, a minimum value VCH_Min and a minimum reference voltage VREF of the plurality of channel voltages VCH1-VCH4, an output voltage VOUT, and a plurality of channel currents ILED1-ILED4 in a steady state. FIGS. 4 and 5 illustrate a case where a LED voltage drop of the first channel CH1 is a minimum and an LED voltage drop is small in order of a second channel CH2, a third channel CH3, and a fourth channel CH4 period.

Referring to FIG. 4, if a minimum value VCH_Min of a plurality of channel voltages is lower than a minimum reference voltage VREF level at a time point T1, the voltage controller 210 raises a DC/DC converter reference voltage VREF_DCDC for a period P11 so that the minimum value VCH_Min may become a minimum reference voltage VREF level. Accordingly, the DC/DC converter raises an output voltage VOUT for the period P11. As the output voltage VOUT rises for the period P11, if a minimum value VCH_Min of a plurality of channel voltages is higher than the minimum reference voltage VREF level at a time point T2, the voltage controller 210 reduces the DC/DC converter reference voltage VREF_DCDC for a period P12 in a speed much slower than a speed of rising the DC/DC converter reference voltage VREF_DCDC. A decrease amount of the reference voltage VREF_DCDC for the period P12 is much smaller than an increase amount of the reference voltage VREF_DCDC for the period P11. A decreasing waveform of the reference voltage VREF_DCDC for the period P12 is lineally shown in FIG. 4, but may be formed in other waveforms. Resultantly, as shown in FIG. 4, the reference voltage VREF_DCDC hardly decreases and sustains a rising level and the output voltage VOUT also sustains a rising level. In this way, for the transition state P1, the output voltage VOUT increases only when the minimum value VCH_Min of the channel voltage is lower than a minimum reference voltage VREF level. At a time point T3, if the minimum value VCH_Min is lower than the minimum reference voltage VREF according to the fourth channel voltage VCH4 in which a voltage drop of a plurality of LEDS is largest, the reference voltage VREF_DCDC and the output voltage VOUT increase for a period P13 and thus the minimum value VCH_Min becomes equal to the minimum reference voltage VREF at a time point T4.

Because each of a plurality of LED channel voltages VCH1-VCH4 is a voltage that subtracts a plurality of LED voltage drops of a corresponding channel from the output voltage VOUT, when sustaining an LED channel voltage having a largest LED voltage drop among the plurality of LED channel voltages VCH1-VCH4 to be equal to the minimum reference voltage VREF, the output voltage VOUT becomes a value in which the minimum reference voltage VREF is added to the voltage having the largest LED voltage drop. Therefore, in a steady state after the time point T4, the output voltage VOUT is uniformly sustained as a voltage in which the minimum reference voltage VREF is added to a plurality of LED voltage drops of the fourth channel CH4 having a largest plurality of LED voltage drops.

As shown in FIG. 5, in a steady state, a channel having a largest voltage drop is set as a fourth channel CH4. For a period P14 in which a current flows to a plurality of LEDS of the first channel CH1, the second channel CH2, and the third channel CH3, or in which a current does not flow to the first to fourth channels CH1-4, the minimum value VCH_Min of the plurality of LED channel voltages is higher than the minimum reference voltage VREF and thus the output voltage VOUT reduces very slowly. At a time point T5 at which a current starts to flow to a plurality of LEDS of the fourth channel CH4, the minimum value VCH_Min of the plurality of LED channel voltages VCH1-VCH4 is lower by a minute difference than the minimum reference voltage VREF by a decreasing amount of the output voltage VOUT for the period P14.

Accordingly, from the time point T5, the reference voltage generator 200 starts to increase the reference voltage VREF_DCDC. Therefore, for a period P15 in which a current flows to a plurality of LEDS of the fourth channel CH4, the minimum value VCH_Min is controlled to agree with the minimum reference voltage VREF. Accordingly, the output voltage VOUT increases until a time point at which the minimum value VCH_Min agrees with the minimum reference voltage VREF. Therefore, the output voltage VOUT is uniformly sustained to a voltage in which the minimum reference voltage VREF is added to a plurality of LED voltage drops of the fourth channel having a largest LED voltage drop.

Figure 6:
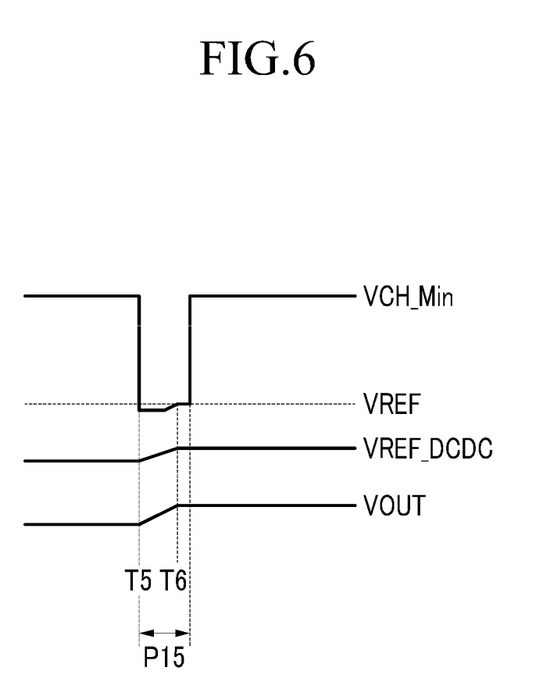
FIG. 6 is a diagram illustrating a period P15 that is shown in FIG. 5.

FIG. 6 is a diagram illustrating a period P15 that is shown in FIG. 5.

FIG. 6 briefly illustrates a minimum value VCH_Min, a reference voltage VREF_DCDC, and an output voltage VOUT in order to describe a period from a time point T5 to a time point T6 in which a minimum value VCH_Min agrees with a minimum reference voltage VREF.

As shown in FIG. 6, from the time point T5, the reference voltage VREF_DCDC starts to increase and the output voltage VOUT also increases. If the minimum value VCH_Min agrees with the minimum reference voltage VREF at the time point T6, the reference voltage VREF_DCDC and the output voltage VOUT are uniformly sustained.

When the output voltage is controlled with such a method, all sync current sources 400_1-400_$n$ that are connected to each of all channels CH1-CHn can receive a voltage necessary for generating a constant current. Thereafter, a contrast ratio of the LED light emitting device can be prevented from being deteriorated.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A control device of a light emitting diode (LED) light emitting device comprising a plurality of LED channels that are formed with a plurality of LED elements, comprising:

a DC/DC converter that supplies an output voltage to the plurality of LED channels, the DC/DC converter comprising a power switch; and a reference voltage generator that generates a reference voltage for controlling the output voltage, wherein the reference voltage generator detects a plurality of channel voltages corresponding to an LED voltage drop by a plurality of LEDS of each of the plurality of LED channels and controls the reference voltage so that a minimum value of the plurality of channel voltages agrees with a predetermined minimum reference voltage, and wherein the reference voltage generator comprises a voltage detection unit that detects the plurality of channel voltages and that outputs the minimum value of the detected plurality of channel voltages; and a voltage controller that compares the minimum value and a level of the minimum reference voltage and that increases, if the minimum value is lower than the minimum reference voltage, the reference voltage, and that decreases, if the minimum value is higher than the minimum reference voltage, the reference voltage.

2. The control device of claim 1, wherein the reference voltage generator raises, if the minimum value is lower than the minimum reference voltage, the reference voltage in order to raise the output voltage.

3. The control device of claim 2, wherein the reference voltage generator reduces, if the minimum value is higher than the minimum reference voltage, the reference voltage.

4. The control device of claim 3, wherein a rising amount of a reference voltage per predetermined unit time when the minimum value is lower than the minimum reference voltage is larger than a falling amount of the reference voltage per the unit time when the minimum value is higher than the minimum reference voltage.

5. The control device of claim 1, wherein the DC/DC converter further comprises:
- a power stage that comprises the power switch, an inductor, and a capacitor and that generates the output voltage by converting an input voltage that is transferred to the inductor according to the switching operation of the power switch; and
- an output voltage controller that controls the output voltage by controlling the switching operation of the power switch using the distribution voltage corresponding to the output voltage and the reference voltage.

6. The control device of claim 5, wherein the output voltage controller comprises:
- a compensation circuit that generates an output control signal by compensating the error signal corresponding to the difference between the reference voltage and the distribution voltage; and
- a switching controller that determines a turn-off time point of the power switch according to the output control signal and that turns on the power switch according to a predetermined clock signal that determines a switching frequency of the power switch.

7. The control device of claim 6, wherein the DC/DC converter further comprises an error amplifier that generates the error signal by receiving the distribution voltage in an inversion terminal and receiving the reference voltage in a non-inversion terminal and amplifying the difference between the distribution voltage and the reference voltage.

* * * * *